(12) United States Patent
Harinck et al.

(10) Patent No.: US 9,657,243 B2
(45) Date of Patent: May 23, 2017

(54) PROCESS AND A REACTION APPARATUS FOR THE GASIFICATION OF WET BIOMASS

(75) Inventors: John Harinck, Delft (NL); Klaas Gerrit Smit, Anna Paulowna (NL)

(73) Assignee: GENSOS HOLDING B.V., Delft (NL)

( * ) Notice: Subject to any disclaimer, the term of this patent is extended or adjusted under 35 U.S.C. 154(b) by 536 days.

(21) Appl. No.: 14/239,630

(22) PCT Filed: Aug. 20, 2012

(86) PCT No.: PCT/EP2012/066198
§ 371 (c)(1),
(2), (4) Date: Feb. 19, 2014

(87) PCT Pub. No.: WO2013/030026
PCT Pub. Date: Mar. 7, 2013

(65) Prior Publication Data
US 2014/0202080 A1   Jul. 24, 2014

(30) Foreign Application Priority Data

Aug. 26, 2011 (NL) ..................... 1039007

(51) Int. Cl.
*C01B 3/38* (2006.01)
*C10J 3/86* (2006.01)
(Continued)

(52) U.S. Cl.
CPC . *C10J 3/86* (2013.01); *C10J 3/78* (2013.01); *C10L 9/086* (2013.01);
(Continued)

(58) Field of Classification Search
None
See application file for complete search history.

(56) References Cited

U.S. PATENT DOCUMENTS 7,658,776 B1   2/2010   Pearson
8,613,782 B2 *  12/2013   Bromberg ................. C10J 3/18
                                                      48/61
(Continued)

FOREIGN PATENT DOCUMENTS

CN        101058404    10/2007
CN        102126704    7/2011
(Continued)

OTHER PUBLICATIONS

Koppejan et al, "Pre-study of supercritical gasification of sewage sludge at water treatment facilities", Procede Biomass B.V., Report commissioned by water board Aa en Maas, published May 2011 (51 pages) & 7 pages of English translation.
(Continued)

*Primary Examiner* — Melvin C Mayes
*Assistant Examiner* — Kenneth Vaden
(74) *Attorney, Agent, or Firm* — Nixon & Vanderhye P.C.

(57) ABSTRACT

A process for the gasification of wet biomass. The process comprises heating wet biomass at a pressure in the range of from 22.1 MPa to 35 MPa. The wet biomass is heated from a temperature of at most $T_1$ to a temperature of at least $T_2$ by heat exchange with a first heating fluid. The gasification product is further heated. The further heated gasification product is used as the first heating fluid, upon which the further heated gasification product is cooled down from a temperature of at least $T_3$ to a temperature of at most $T_4$. The temperatures $T_1$, $T_2$, $T_3$ and $T_4$ can be calculated by using certain mathematical formulae. Also claimed: a reaction apparatus for the gasification of wet biomass.

21 Claims, 3 Drawing Sheets

Figure 1:
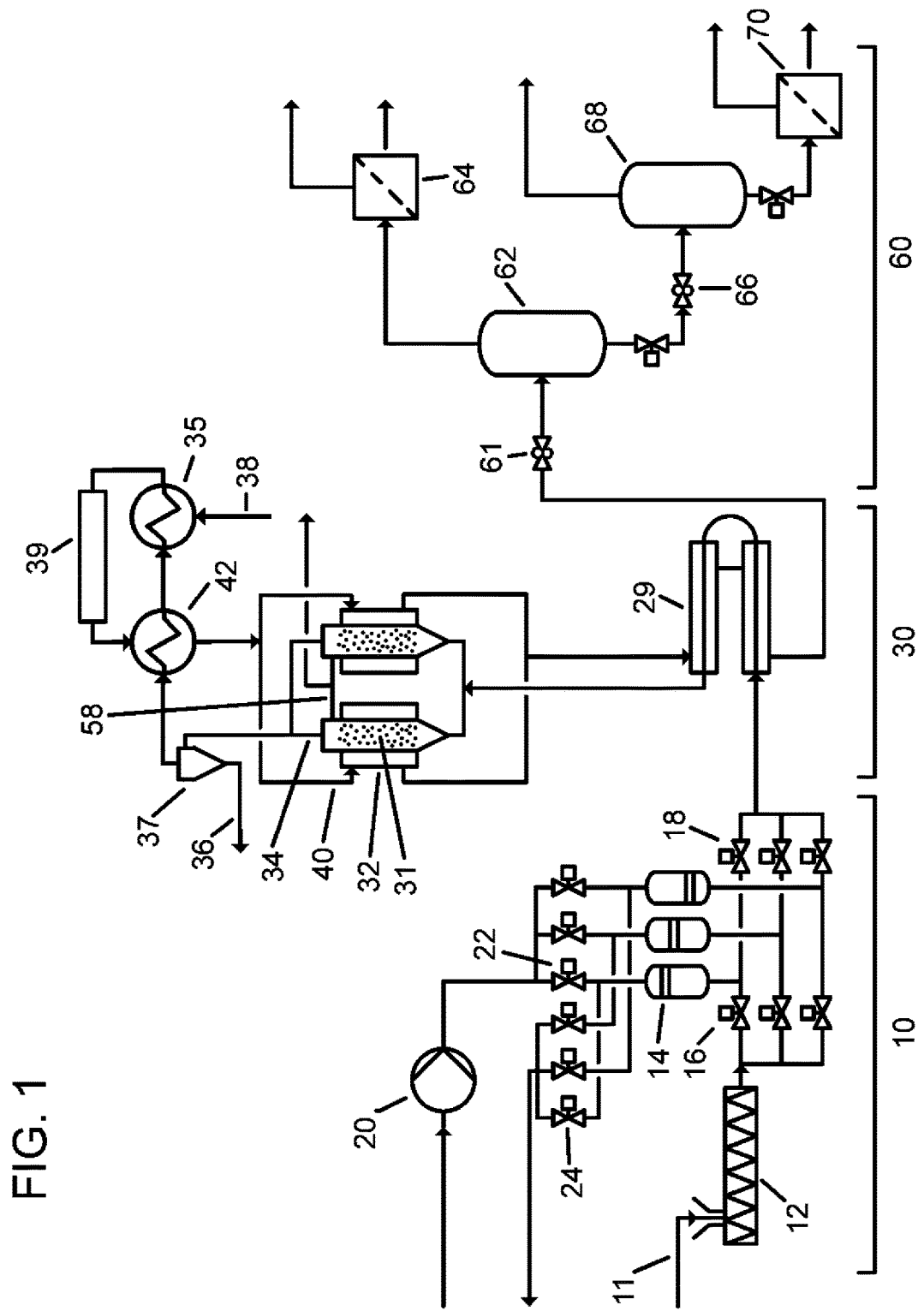

(51) Int. Cl.
*C10J 3/78* (2006.01)
*C10L 9/08* (2006.01)
(52) U.S. Cl.
CPC ............... *C10J 2300/0916* (2013.01); *C10J 2300/0923* (2013.01); *C10J 2300/0979* (2013.01); *C10J 2300/1884* (2013.01); *Y02E 50/14* (2013.01)

(56) References Cited

U.S. PATENT DOCUMENTS

| | | | | |
|---|---|---|---|---|
| 2007/0261948 | A1* | 11/2007 | Jacobsen | ............ C10J 3/04 201/15 |
| 2008/0171899 | A1* | 7/2008 | Pulkrabek | ............ C10J 3/20 585/240 |
| 2009/0126274 | A1 | 5/2009 | Vogel et al. | |
| 2009/0308726 | A1 | 12/2009 | Dahmen et al. | |
| 2010/0083575 | A1* | 4/2010 | Varadaraj | ............ C10J 3/466 48/209 |
| 2012/0060418 | A1* | 3/2012 | Epstein | ............ B01J 23/462 48/127.7 |
| 2014/0202845 | A1* | 7/2014 | Harinck | ............ C10J 3/78 201/31 |

FOREIGN PATENT DOCUMENTS

| | | |
|---|---|---|
| EP | 2 138 555 | 12/2009 |
| JP | 11-319896 | 11/1999 |
| JP | 2000-271468 | 10/2000 |
| JP | 2006-21069 | 1/2006 |
| JP | 2007-269945 | 10/2007 |
| JP | 2007-269946 | 10/2007 |
| WO | WO 2010/046538 | 4/2010 |
| WO | WO 2010/134077 | 11/2010 |
| WO | WO 2013/030026 | 3/2013 |
| WO | WO 2013/030028 | 3/2013 |

OTHER PUBLICATIONS

O. Levenspiel, "Chemical Reaction Engineering, Second Edition", *Dept. of Chemical Engineering—Oregon State University*, Ch. 9, 1962, 3 pgs.

Matsumura et al., "Fundamental design of a continuous biomass gasification process using a supercritical water fluidized bed", *International Journal of Hydrogen Energy*, vol. 29, No. 7, Jul. 1, 2004, pp. 701-707.

Matsumura, "Evaluation of supercritical water gasification and biomethanation for wet biomass utilization in Japan", *Energy Conversion and Management*, vol. 43, 2007, pp. 1301-1310.

Merriam Webster Dictionary, "Plus or Minus Definition"—[Online], http://www.merriam-webster.com/dictionary/plus%20or%20minus, printed Mar. 11, 2013.

International Search Report for PCT/EP2012/066198, mailed Nov. 30, 2012.

Written Opinion of the IPEA for PCT/EP2012/066198, mailed Jul. 24, 2013.

International Preliminary Report on Patentability for PCT/EP2012/066198, mailed Nov. 7, 2013.

NL Search Report for 1039007 dated Feb. 9, 2012.

NL Search Report for 2009344 dated Aug. 23, 2012.

NL Search Report for 1039006 dated Aug. 26, 2011.

International Search Report for PCT/EP2012/066199, mailed Nov. 21, 2012.

Written Opinion of the ISA for PCT/EP2012/066199, mailed Nov. 21, 2012.

Written Opinion of the IPEA for PCT/EP2012/066199, mailed Jul. 24, 2013.

International Preliminary Report on Patentability for PCT/EP2012/066199, mailed Nov. 7, 2013.

International Search Report for PCT/EP2012/066200, mailed Nov. 21, 2012.

Written Opinion of the ISA for PCT/EP2012/066200, mailed Nov. 21, 2012.

Written Opinion of the IPEA for PCT/EP2012/066200, mailed Jul. 31, 2013.

International Preliminary Report on Patentability for PCT/EP2012/066200, mailed Nov. 7, 2013.

USPTO Office Action dated Sep. 30, 2016 from U.S. Appl. No. 14/239,585 (Reaction Apparatus and a Process for the Gasification of Wet Biomass, Harinck et al. filed Feb. 19, 2014 (pending claims (US2012/0060418 (Epstein, Mar. 2012), U.S. Pat. No. 2,631,159 (Keith, Mar. 1953) & USP 5,384,336 (Koros, Jan. 1995) attached)).

* cited by examiner

PROCESS AND A REACTION APPARATUS FOR THE GASIFICATION OF WET BIOMASS This application is the U.S. national phase of International Application No. PCT/EP2012/066198, filed 20 Aug. 2012, which designated the U.S., and claims priority to NL Application No. 1039007, filed on 26 Aug. 2011; the entire contents of each of which are hereby incorporated herein by reference.

The present invention relates to a process for the gasification of wet biomass. The invention also relates to a reaction apparatus for the gasification of wet biomass.

Wet biomass, such as residues from fermentation facilities and animal manures, is available in vast quantities, and needs to be disposed of. It comprises organic materials which can be converted in a high-temperature gasification reaction to a methane and hydrogen-rich gas. Methane and hydrogen are both valuable fuels. In this manner, wet biomass may in principle be an environmentally friendly and sustainable source of energy, which does not contribute to the build-up of greenhouse gasses in the atmosphere.

In addition to the organic materials, wet biomass comprises minerals, and other inorganic materials, such as sand and water. Water may be present in a substantial quantity. Supercritical water is a good solvent for many organic materials, and a poor solvent for minerals and other inorganic materials. It has therefore been suggested to perform the gasification of wet biomass at conditions at which the water is present in the reaction mixture as supercritical water. These conditions comprise a temperature which is above the critical temperature of water, which is 373.946° C., and a pressure which is above the critical pressure of water, which is 22.064 MPa (220.64 bar).

In E Dinjus and A Kruse, "Hot compressed water—a suitable and sustainable solvent and reaction medium" (J. Phys.: Condens. Matter 16 (2004), p. 1161-1169), the authors disclose under the heading "Gasification in supercritical water" a process for the gasification of wet biomass, which process comprises heating wet biomass in the gasification reactor by heat exchange with a flue gas as the heating fluid.

Energy efficient operation is an important feature of such a high temperature gasification process. It is desirable to improve the energy efficiency of the gasification in the presence of supercritical water.

Is has been found that the energy efficiency of the gasification in the presence of supercritical water can be improved by further heating the fluid gasification product withdrawn from the gasification and heating wet biomass by heat exchange with the further heated fluid gasification product. The fluid gasification product may be further heated using energy from an external energy source.

The present invention provides a process for the gasification of wet biomass, which process comprises heating wet biomass at a pressure $P_p$ in the range of from 22.1 MPa to 35 MPa (absolute) from a temperature of at most $T_1$ to a temperature of at least $T_2$ by heat exchange with a first heating fluid, upon which heating a fluid gasification product is obtained, further heating the fluid gasification product, and using the further heated fluid gasification product as the first heating fluid, upon which use the further heated fluid gasification product is cooled down at a pressure $P_s$ in the range of from 22.1 MPa to 35 MPa (absolute) from a temperature of at least $T_3$ to a temperature of at most $T_4$, wherein $T_1$, $T_2$, $T_3$ and $T_4$ are temperatures in ° C. which can be calculated by using the mathematical formulae $$T_1=3.2\times P_p+301.6,$$

$$T_2=3.8\times P_p+292.4,$$

$$T_3=3.8\times P_s+292.4, \text{ and}$$

$$T_4=3.2\times P_s+301.6,$$

wherein $P_p$ and $P_s$ denote the pressures $P_p$ and $P_s$, respectively, in MPa.

In a preferred embodiment further heating the fluid gasification product comprises heat exchange with a second heating fluid.

The present invention also provides a reaction apparatus for the gasification of wet biomass, which reaction apparatus comprises a reactor comprising a reaction tube and a heating device, wherein
the reaction tube is configured to be fluidly connected to a source of wet biomass having a pressure $P_p$ in the range of from 22.1 MPa to 35 MPa (absolute), and
the heating device is configured to heat the reaction tube and the wet biomass, when present in the reaction tube, by heat exchange with a first heating fluid to heat the wet biomass from a temperature of at most $T_1$ to a temperature of at least $T_2$, and a heater which heater is fluidly connected to the reaction tube and to the heating device and which heater is configured to receive fluid gasification product to further heat the fluid gasification product by using energy from an energy source, and to feed the further heated fluid gasification product at a pressure $P_s$ in the range of from 22.1 MPa to 35 MPa (absolute) into the heating device for use as the first heating fluid, upon which use the further heated fluid gasification product is cooled down from a temperature of at least $T_3$ to a temperature of at most $T_4$, wherein $T_1$, $T_2$, $T_3$ and $T_4$ are temperatures in ° C. which can be calculated by using the mathematical formulae $$T_1=3.2\times P_p+301.6,$$

$$T_2=3.8\times P_p+292.4,$$

$$T_3=3.8\times P_s+292.4, \text{ and}$$

$$T_4=3.2\times P_s+301.6,$$

wherein $P_p$ and $P_s$ denote the pressures $P_p$ and $P_s$, respectively, in MPa.

In a preferred embodiment the heater is a heat exchanger which heat exchanger is fluidly connected to the reaction tube, to the heating device and to a source of a second heating fluid, and which heat exchanger is configured to receive fluid gasification product from the reaction tube to further heat the fluid gasification product by heat exchange with the second heating fluid, and to feed the further heated fluid gasification product into the heating device for use as the first heating fluid.

Thus, in accordance with this invention, energy may be supplied from an energy source, for example electrical energy from an electrical power plant or heat from a combustion process, to the gasification process by further heating the fluid gasification product and using the further heated gasification product as a source of heat for heating the wet biomass above the temperature at which subcritical water becomes supercritical water. The heat supplied from the energy source may represent at least a portion of the net heat requirement of the gasification process. The invention provides an unexpected improvement in energy efficiency relative to the known process in which energy is supplied from the energy source directly to the wet biomass up to heat the wet biomass above the temperature at which subcritical water becomes supercritical water.

Without wishing to be bound by theory, the improvement involves an improved heat integration, which may be explained as follows. At pressures at or above the critical pressure the heat capacity of water is substantially higher at or around the critical temperature than at temperatures away from the critical temperature. Therefore, heating wet biomass over a temperature range around the critical temperature of water requires substantially more heat than heating over a temperature range of similar width further away from the critical temperature. The reverse is also true: cooling down over a temperature range around the critical temperature of water releases more heat than cooling down over a temperature range of similar width further away from the critical temperature. By applying the heat integration in accordance with the invention, the relatively large amount of heat released around the critical temperature when cooling down gasification product comprising supercritical water is used to satisfy the relatively large heat requirement around the critical temperature when heating wet biomass. Without the invention, the heat supplied from the energy source may be substantially more than the net heat requirement of the gasification process, because a relatively large amount of heat may be accumulated in the gasification product comprising supercritical water, which relatively large amount of heat may be difficult to utilise in an efficient manner in the gasification process.

At the critical pressure of water, the temperature at which the heat capacity of water is at maximum equals approximately the critical temperature of water. It has been found that the temperature at which the heat capacity is at maximum is somewhat dependent on the prevailing pressure, in the sense that the maximum tends to shift to a higher temperature, when the pressure is higher. In addition, the peak in the heat capacity versus temperature curve becomes wider, when the pressure is higher. The temperature at which the heat capacity is at maximum follows closely a linear relationship with the pressure in the relevant pressure range. Hence, in accordance with this invention the temperatures $T_1$, $T_2$, $T_3$ and $T_4$ are selected in dependence of the prevailing pressures $P_p$ and $P_s$, in accordance with the mathematical formulae as specified herein.

FIG. 1 provides a scheme of an embodiment of a reaction apparatus and process for the gasification of wet biomass in accordance with this invention.

Figure 2:
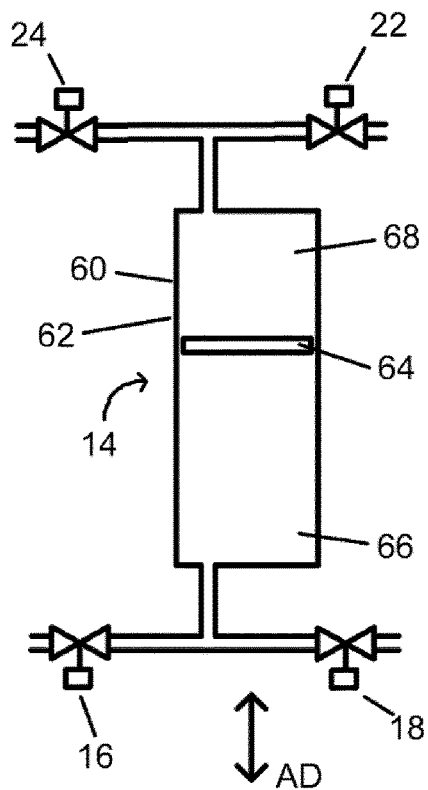

FIG. 2 provides a schematic of a portion of a feeding system for use in an embodiment of the gasification process in accordance with the invention.

Figure 3:
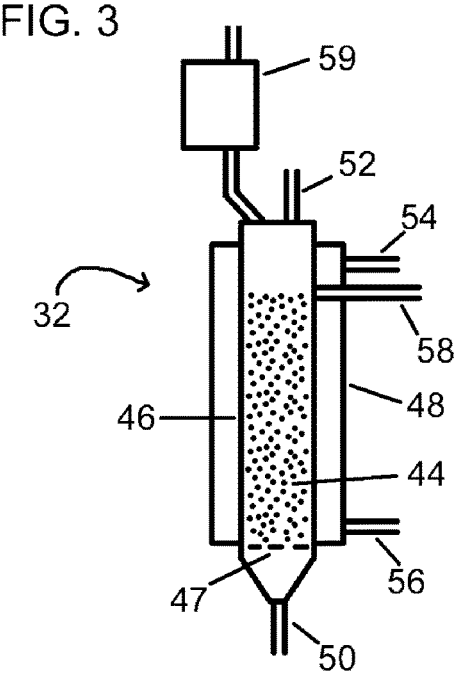

FIG. 3 provides a schematic of a reactor which is suitable for use in an embodiment of the gasification process in accordance with this invention.

Figure 4:
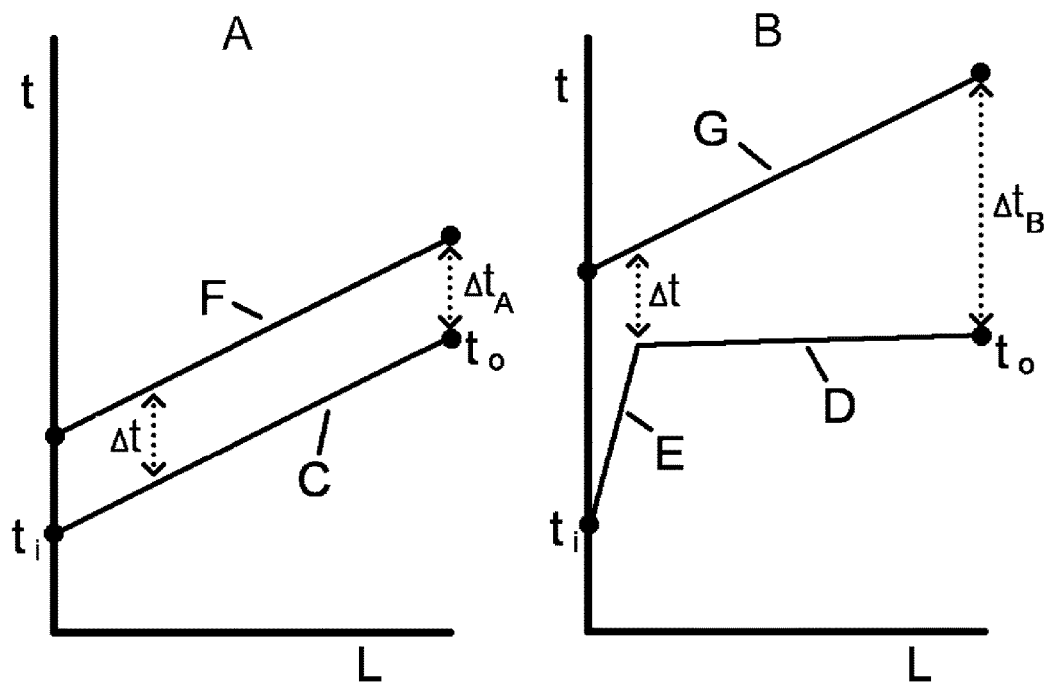

FIG. 4 shows temperature profiles of a reaction tube and a heating fluid over the length of the reaction tube with back-mixing and substantially without back-mixing in the reaction tube.

Throughout the Figures, the same objects will have the same reference numbers.

As used in this patent document, supercritical water is water above its critical temperature and above its critical pressure, and subcritical water is water below its critical temperature and above its critical pressure. It is generally known that water has its critical temperature at 373.946° C. and its critical pressure at 220.64 bar (22.064 MPa), cf. W. Wagner and A. Pruss, "The IAPWS Formulation 1995 for the Thermodynamic Properties of Ordinary Water Substance for General and Scientific Use," J. Phys. Chem. Ref. Data, 31(2):387-535, 2002. As specified herein, pressure is absolute pressure. The term "fluid gasification product" is used herein in order to distinguish fluid (including gaseous and liquid) products of the gasification reaction from solid products, such as tars en solidified salts.

The wet biomass for use in the gasification process may be of various origins. The wet biomass may be, for example, residue from a fermentation facility, sewage sludge, dredging sludge, algae, or animal manures. Mixtures of wet biomasses of different origins may be employed. The wet biomass may or may not be pretreated before being introduced into the gasification process. Pretreating may involve shredding or cutting, for example, reducing the size or length of fibrous materials in the wet biomass, such as grass, straw or small stems. Water may be added to the wet biomass or water may be removed from the wet biomass, for example, to achieve a desired viscosity or density. Water may be removed by centrifuging or by gravitational sedimentation. Materials may be added to the biomass. For example, solid particles may be added to the wet biomass, supplementing solid particles of the bed of solid particles present in the reactor.

The wet biomass as fed to the gasification process comprises water, for example in a quantity of at least 40% w, typically at least 50% w, more typically at least 70% w, relative to the total weight of the wet biomass. In the normal practice of this invention, the water content is at most 95% w, on the same basis. The content of organic material is typically at least 1% w, more typically at least 5% w, and typically at most 60% w, more typically at most 50% w, on the same basis. The content of inorganic materials, other than water, is typically at least 1% w, more typically at least 3% w, and typically at most 80% w, more typically at most 60% w, on the same basis. The contents of organic and inorganic materials are as determined by thermal gravimetric analysis (TGA) in accordance with ASTM E1131-08.

The gasification process is performed at a high pressure. Wet biomass may be pressurised and fed to the gasification reaction by using a pumping system. Eligible pumping systems may comprise a conventional high pressure pump, for example a piston pump or a membrane pump. However, such conventional pumping systems may be expensive as they must be robust and resistant to the action of fibrous material, sand and other solid particles, which may be present in the wet biomass and cause abrasion and/or clogging.

It has been found advantageous to employ a feeding pump for pumping wet biomass at low pressure into a cylinder. The cylinder comprises a piston which is movable in the axial direction of the cylinder. The piston, together with the cylinder walls, form two chambers inside the cylinder, which chambers are separated from each other by the piston. When wet biomass is fed at low pressure into the first chamber of the cylinder, and the first chamber receives wet biomass, the piston may move in the axial direction of the cylinder, away from the point of feeding wet biomass, so that the volume of the first chamber is increased. As used herein, the term "low pressure" may mean a pressure of less than 5 MPa. A suitable low pressure may be in the range of from 0.15 MPa to 5 MPa, more suitable in the range of from 0.2 MPa to 4 MPa, in particular in the range of from 0.3 MPa to 3 MPa. When subsequently a sufficiently high force is exerted onto the piston, which causes the piston to move into the opposite direction, the volume of the first chamber is decreased and wet biomass is discharged from the first cylinder at high pressure. Wet biomass so discharged at high pressure may be employed as feed in the gasification process of this invention. As used herein, the term "high pressure" may mean a pressure of at least 5 MPa, more typically at least 10 MPa, in particular at least 15 MPa, more in particular at least 20 MPa. The skilled person will appreciate that the force exerted onto the piston will be high enough to accommodate the pressure at which wet biomass is fed to the reactor, as specified hereinafter.

Biomass may be fed to the first chamber by using a pump which operates at low pressure and which may be fluidly connected to the first chamber. Suitable pumps may be, for example, a worm pump or a lobe pump. The feeding pump may be equipped at the input side or at the output side with a shredder or cutter for reducing the size of fibrous material which may be present in the wet biomass.

The force which may be exerted onto the piston may be a mechanical force, using a screw or a piston rod. The force is preferably a hydraulic force exerted onto the piston by using a hydraulic fluid. The hydraulic fluid may be a hydraulic oil, but it is preferred to selected an aqueous liquid as the hydraulic fluid. The aqueous liquid may be filtered surface water, for example obtained from a river, a canal or a lake, or it may be tap water, drinking water, desalted water, or distilled water. Preferably, the aqueous liquid is filtered water.

The hydraulic fluid may be fed to the second chamber at high pressure by using a hydraulic pump which may be fluidly connected to the second chamber. For example, the pump may be a positive displacement pump, such as a piston pump, which may also be referred to as a plunger pump, or a membrane pump. When wet biomass is fed into the first chamber, and the piston moves in the axial direction of the cylinder, such that the volume of the first chamber increases, the volume of the second chamber decreases, with concomitant discharge of hydraulic fluid from the second chamber, for example into a reservoir which may also be used to hold a supply of hydraulic fluid as feed for the hydraulic pump. The skilled person will appreciate that the pressure at which the hydraulic fluid may be fed to the second chamber is equal to or higher than the high pressure, typically at most 2 MPa, in particular at most 1 MPa, more in particular at most 0.5 MPa, higher than the high pressure. The pressure at which the hydraulic fluid may be fed to the second chamber may typically be at least 0.001 MPa, in particular at least 0.01 MPa, higher than the high pressure.

A plurality of the cylinders comprising the piston, for example two, three or four cylinders with piston, may be employed in a parallel arrangement. By employing such an arrangement, a higher total feeding rate and/or an uninterrupted or continuous feed may be achieved. The skilled person will appreciate that the feeding system as described may employ valves which ensure that at any time the various streams of wet biomass and hydraulic fluid, if present, come from the appropriate source and find the appropriate destination. This will be set out further in the discussion of FIGS. 1 and 2, hereinafter.

As set out hereinbefore, the gasification of wet biomass is performed at conditions at which the water is present in the reaction mixture as supercritical water. It is preferred to convert subcritical water in the feed into supercritical water inside a reactor. Thus, heating wet biomass at a pressure of in the range of from 22.1 MPa to 35 PMa from a temperature of at most $T_1$, as defined hereinbefore, to a temperature of at least $T_2$, as defined hereinbefore, by heat exchange with a first heating fluid is preferably carried out in a reactor.

The wet biomass may be preheated to the temperature of at most $T_1$, as defined hereinbefore. Preheating may be accomplished before feeding to the reactor. Typically, the wet biomass may be preheated to a temperature of at most 370° C., more typically at most 360° C., in particular at most 350° C. Typically, the wet biomass may be preheated to a temperature of at least 250° C., more typically at least 280° C., preferably at least 300° C.

In accordance with this invention, the pressure $P_p$, as defined hereinbefore, is in the range of from 22.1 MPa to 35 MPa. Within this range, the pressure $P_p$ is suitably at least 22.5 MPa, preferably at least 23 MPa, more preferably at least 25 MPa, and, within this range, the pressure $P_p$ is suitably at most 33 MPa, preferably at most 32 MPa, more preferably at most 30 MPa.

The temperature of the wet biomass is subsequently increased from a temperature of at most $T_1$, as defined hereinbefore, to a temperature of at least $T_2$, as defined hereinbefore. In a preferred embodiment, the temperature of the wet biomass is increased from a temperature of at most $T_1$ to a temperature of at least $T_2$, wherein $T_1$ and $T_2$ are temperatures in ° C. as defined by the mathematical formulae $$T_1 = 2.9 \times P_p + 306.2 \text{ and } T_2 = 4.1 \times P_p + 287.8,$$

wherein $P_p$ is the pressure $P_p$, as defined hereinbefore. In a more preferred embodiment, the temperature of the wet biomass is increased from a temperature of at most $T_1$ to a temperature of at least $T_2$, wherein $T_1$ and $T_2$ are temperatures in ° C. as defined by the mathematical formulae $$T_1 = 2.6 \times P_p + 310.8 \text{ and } T_2 = 4.4 \times P_p + 283.2,$$

wherein $P_p$ is the pressure $P_p$, as defined hereinbefore.

Typically the increase from the temperature of at most $T_1$ to the temperature of at least $T_2$ is at least 10° C., more typically at least 20° C., in particular at least 30° C. Typically the increase from the temperature of at most $T_1$ to the temperature of at least $T_2$ is at most 450° C., more typically at most 400° C., in particular at most 350° C. Typically the temperature of the feed is increased to a temperature of at least $T_2$ of at least 377° C., more typically at least 380° C., in particular at least 400° C., more in particular at least 420° C. Typically the temperature of the feed is increased to a temperature of at least $T_2$ of at most 800° C., more typically at most 760° C. At the temperature of at least $T_2$, as defined herein, water is present in the wet biomass as supercritical water. The temperature of at least $T_2$ may be selected such that the gasification reactions proceed at a rate as desired.

When performing the gasification in the presence of supercritical water, there may be a problem in that the solids formed upon the formation of supercritical water, such as salts, ash and char, tend to stick to the inner wall of the reactor and can cause clogging of the reactor. It has unexpectedly been found that this problem can be eliminated effectively by converting water present in the wet biomass into supercritical water in the presence of a bed of solid particles suspended in a fluid. Thus, the biomass may preferably be fed at a temperature below the critical temperature of water to the reactor comprising the bed of solid particles, and, subsequently, inside the reactor, the temperature of the feed may be increased to above the critical temperature, so that supercritical water is formed in the presence of the bed of solid particles.

The bed of solid particles suspended in a fluid may preferably be a fluidised bed, typically a spouted fluidised bed or a circulating fluidised bed, and preferably a bubbling fluidised bed. In alternative embodiments the bed may be a fixed bed.

The fluid in which the solid particles are suspended is typically an aqueous fluid. Depending on the location in the reactor, the aqueous fluid may comprise supercritical water or subcritical water. Namely, close to a point of feeding the wet biomass, the temperature may be below the critical temperature of water, and at other points the temperature may be above the critical temperature of water. As gasification proceeds, the fluid may also comprise fluid gasification products, in particular at locations away from the point of feeding the wet biomass.

The solid particles suspended in the fluid may be particles comprising, for example, a mineral or an aggregate of minerals, such as sand, crushed rock or crushed stone; a salt, for example a salt originating from wet biomass; metal, such as stainless steel, copper or aluminum; or a crystalline or non-crystalline ceramic, such as a glass, a clay, an alumina, a silica, a silica-alumina, or mixtures thereof. The material of the solid particles may have a density in a wide range, for example, in the range of from $1.5 \times 10^3$ kg/m$^3$ to $10 \times 10^3$ kg/m$^3$, more typically in the range of from $2 \times 10^3$ kg/m$^3$ to $9 \times 10^3$ kg/m$^3$. The particles may typically comprise particles having a size in the range of from 20 μm to 1 mm, in particular in the range of from 50 μm to 0.5 mm, wherein the size of the particles is as determined by ISO 13320:2009. Preferably, all particles have a size in the range as specified. The suspended solid particles may have a dual function in the gasification process, in that they assist in preventing solids from depositing on the inner wall of the reactor, and in addition they may act as a catalyst in the gasification reaction.

The solid particles may be fed into the reactor together with the wet biomass. For example, at least a portion of the solid particles may be sand which may inevitably be present in the wet biomass as one of its components. Alternatively, solid particles may be added to the wet biomass before feeding the wet biomass to the reactor. Dissolved salts which are present in the wet biomass may solidify in the reactor upon and/or after the formation of supercritical water, and such solidified salts may then constitute a portion of the bed of suspended solid particles. As another alternative, solid particles may be introduced into the reactor separate from the wet biomass.

The bed of suspended particles may have a void fraction which is selected from a wide range. Typically, the void fraction of the fluidised bed is in the range of from 0.05 to 0.95 v/v, relative to the total volume of the bed. When the bed is a bubbling fluidised bed, the void fraction may typically be in the range of from 0.25 to 0.8 v/v, more typically in the range of from 0.35 to 0.7 v/v, relative to the total volume of the bed. When the bed is a spouted fluidised bed, the void fraction may typically be in the range of from 0.05 to 0.2 v/v, relative to the total volume of the bed. When the bed is a circulating fluidised bed, the void fraction may typically be in the range of from 0.8 to 0.95 v/v, relative to the total volume of the bed. As used herein, the total volume of the bed is the volume of the bed at the conditions of temperature and pressure of the bed, and is as determined from the reactor dimensions and/or the dimensions of the portion of the reactor which holds the bed. The void volume is as determined by subtracting the particles volume from the bed volume. The particles volume may be determined by submersing the particles present in the bed in water and determining the displaced volume of water.

The size of the reactor is not essential. Preferably, the residence time in the reactor is high enough for obtaining a sufficient yield of fluid gasification products. Thus, when the gasification process is operated in a continuous mode, the dimensions of the reactor are preferably such that at a desired throughput a sufficiently long residence time is achieved. It is also desired, for avoidance of the formation of tars, that in the reactor, or in the portion of the reactor which holds the bed of solid particles, the rate of temperature increase of the feed is high. Typically, the rate of temperature increase is at least 1.5° C./s, preferably at least 2° C./s. In the normal practice of the gasification process, the rate of temperature increase will frequently be at most 80° C./s, more frequently at most 50° C./s. The rate of temperature increase is as determined by calculating the quotient of the temperature increase and the average residence time of the fluid in the reactor or in the portion of the reactor which holds the bed of solid particles. The average residence time is determined from experiments using a tracer material.

The fluid gasification product may be withdrawn from the reactor together with supercritical water. The fluid gasification product may also comprise entrained solid particles. Solid particles entrained in the fluid gasification product leaving the reactor may be removed. The fluid gasification product may be cooled and depressurised, resulting in a gas/aqueous liquid mixture, and gaseous gasification products may subsequently be recovered from the gas/aqueous liquid mixture.

In accordance with this invention, prior to cooling, the fluid gasification product is further heated. The further heated fluid gasification product is used as the first heating fluid. It is generally sufficient to further heat fluid gasification product as to increase its temperature typically by at most 200° C., more typically by at most 150° C., for example 100° C. The temperature increase is typically at least 10° C., more typically at least 20° C. Electrical energy may be applied to accomplish the further heating. Preferably, the fluid gasification product is further heated by heat exchange with a second heating fluid. The second heating fluid may be a hot gas produced in a hot-gas producing unit. The hot-gas producing unit may be, for example, a gas burner, a gas turbine, a gas engine or a fuel cell.

For optimisation purposes, the further heated fluid gasification product may be kept at a high temperature for some time before the further heated fluid gasification product is used as the first heating fluid, as this will have the advantageous effect of increasing the methane content of the fluid gasification product. Thus, the process of the invention may comprise as an additional step maintaining the temperature of the further heated fluid gasification product, typically for a period of at least 5 minutes, in particular at least 10 minutes, and typically for a period of at most 1 hour, in particular at most 40 minutes. This may be accomplished by using a vessel, preferably an insulated vessel or a heated vessel, which may hold the further heated fluid gasification for the time as specified. Herein, "maintaining the temperature" means maintaining the temperature typically within a margin of plus or minus 50° C., more typically within a margin of plus or minus 40° C., in particular within a margin of plus or minus 30° C.

In accordance with this invention, the further heated gasification is used as the first heating fluid, upon which use the further heated gasification is cooled down at the pressure $P_s$, as defined hereinbefore, in the range of from 22.1 MPa to 35 MPa. Within this range, the pressure $P_s$ is suitably at least 22.5 MPa, preferably at least 23 MPa, more preferably at least 25 MPa, and, within this range, the pressure $P_s$ is suitably at most 33 MPa, preferably at most 32 MPa, more preferably at most 30 MPa. When, as in preferred embodiments, the gasification process is carried out as a continuous process, cooling down gasification product proceeds downstream from heating the wet biomass, in which case the pressure $P_s$ is generally lower than the pressure $P_p$. Typically, the pressure $P_s$ is at least 0.001 MPa, more typically at least 0.01 MPa, lower than the pressure $P_p$. Typically, the pressure $P_s$ is at most 10 MPa, more typically at most 8 MPa, in particular at most 5 MPa, lower than the pressure $P_p$.

The further heated gasification is cooled down from a temperature of at least $T_3$ to a temperature of at most $T_4$, wherein $T_3$ and $T_4$ are temperatures in ° C., as defined hereinbefore. In a preferred embodiment, the further heated gasification is cooled down from a temperature of at least $T_3$ to a temperature of at most $T_4$, wherein $T_3$ and $T_4$ are temperatures in ° C. as defined by the mathematical formulae $$T_3=4.1 \times P_s+287.8, \text{ and } T_4=2.9 \times P_s+306.2,$$

wherein $P_s$ is the pressure $P_s$ in MPa, as defined hereinbefore. In a more preferred embodiment, the further heated gasification is cooled down from a temperature of at least $T_3$ to a temperature of at most $T_4$, wherein $T_3$ and $T_4$ are temperatures in ° C. as defined by the mathematical formulae $$T_3=4.4 \times P_s+283.2, \text{ and } T_4=2.6 \times P_s+310.8,$$

wherein $P_s$ is the pressure $P_s$ in MPa, as defined hereinbefore. The temperature of at least $T_3$ may typically be at least 425° C., in particular at least 440° C., and typically at most 900° C., more typically at most 850° C. The decrease from the temperature of at least $T_3$ to the temperature of at most $T_4$ typically amounts to at least 10° C., more typically at least 20° C., in particular at least 30° C. Typically the decrease from the temperature of at least $T_3$ to the temperature of at most $T_4$ is at most 450° C., more typically at most 400° C., in particular at most 350° C. The further heated gasification product may be cooled down typically to a temperature of at most 390° C., in particular at most 380° C., more in particular at most 370° C., or even at most 360° C. Typically, it may be cooled down to a temperature of at least 300° C., more typically at least 320° C.

In accordance with this invention, the wet biomass is heated by heat exchange with the further heated fluid gasification product as the first heating fluid first heating fluid. In an embodiment, the heat exchange may comprise heat exchange between a flow of the wet biomass and a flow of the further heated fluid gasification product which is co-current with the flow of the wet biomass. In such an embodiment, the temperature of at least $T_3$ and the temperature of at most $T_4$ are preferably both selected higher than the temperature of at least $T_2$. In a preferred embodiment, the heat exchange comprises heat exchange between a flow of the wet biomass and a flow of the further heated fluid gasification product which is counter-current with the flow of the wet biomass. The latter embodiment is preferred as the temperature of at least $T_3$ may be selected higher than the temperature of at least $T_2$ and the temperature of at most $T_4$ may be selected higher than the temperature of at most $T_1$, which makes the latter embodiment more energy efficient that the primer embodiment. Now turning to the Figures, FIG. 1 provides a scheme of an embodiment of a reaction apparatus and process for the gasification of wet biomass in accordance with this invention. The reaction apparatus may comprise feeding system 10, heating and reaction system 30 and recovery system 60.

Wet biomass 11 may be pressurised and introduced into heating and reaction system 30 by using a pumping system. It has been found advantageous to employ feeding pump 12 for pumping a portion of wet biomass 11 at low pressure into cylinder with piston 14, via valve 16. As an alternative to the use of feeding pump 12, wet biomass may be fed hydrostatically from a storage tank. Subsequently, valve 16 may be closed. Then, the wet biomass may be discharged at high pressure from cylinder with piston 14 via valve 18 into heating and reaction system 30, by using a hydraulic system comprising hydraulic pump 20 and valves 22 and 24. Hydraulic pump 20 may pump a hydraulic fluid via valve 22 into the second chamber of cylinder with piston 14, valves 16 and 24 being closed. After discharging the wet biomass into heating and reaction system 30, valve 18 may be closed, valves 16 and 24 may be opened and a further portion of wet biomass may be pumped from feeding pump 12 into cylinder 14. A plurality of cylinders with pistons 14 and a plurality of valves 16, 18, 22 and 24 may be placed in parallel arrangement.

FIG. 2 shows cylinder with piston 14, comprising cylinder wall 60. Piston 64 is located inside cylinder 62, and is movable in the axial direction AD of cylinder 62. Piston 64 divides the space inside cylinder 62 into first chamber 66 and second chamber 68. Piston 64 may be oriented generally perpendicularly relative to axial direction AD. Conduits may fluidly connect first chamber 66 via valve 16 to feeding pump 12 (FIG. 1) and via valve 18 to heating and reaction system 30 (FIG. 1). In addition, conduits may fluidly connect second chamber 68 via valve 22 to hydraulic pump 20 (FIG. 1) and via valve 24 to an outlet (not drawn) for hydraulic fluid or to a reservoir (not drawn) for holding a supply of hydraulic fluid.

The shape and size of cylinder 62 are not essential to the invention, and may be selected in accordance with the pumping capacity desired. Cylinder 62 may typically be a circular cylinder. The internal cross sectional area of the cylinder may typically be in the range of from 80 mm$^2$ to 20 dm$^2$, in particular in the range of from 7 cm$^2$ to 3.2 dm$^2$. The stroke of piston 64 may typically be in the range of from 0.1 m to 3 m, in particular in the range of from 0.2 m to 2.5 m. The wall thickness of the cylinder may typically be in the range of from 1 mm to 10 cm, in particular in the range of from 1.5 mm to 2 cm. The thickness of piston 64 may typically be in the range of from 1 mm to 30 cm, in particular in the range of from 1 cm to 20 cm. Cylinder 62 and piston 64 may typically be made of cast iron or steel, or a combination thereof. Cylinder with piston 14 may typically operate at a frequency in the range of from 0.1 strokes/minute to 50 strokes/minute, in particular a frequency in the range of from 0.2 strokes/minute to 20 strokes/minute, in which one stroke is a complete movement of the piston, which includes a movement towards the point of feeding wet biomass and a movement away from the point of feeding wet biomass.

Now turning again to FIG. 1, in heating and reaction system 30, heat exchanger 29 may be, for example, a double tube heat exchanger or a shell and tube heat exchanger. In heat exchanger 29, the wet biomass may be preheated to a temperature below the critical temperature of water, as set out hereinbefore. Then the preheated wet biomass may be introduced into reactor 32 comprising bed 31 of solid particles suspended in a fluid. In reactor 32 the wet biomass may be further heated to a temperature of at least $T_2$, as set out hereinbefore. For the purpose of heating the wet biomass, reactor 32 comprises the heating device, for example a heating jacket and/or internal heating pipes through which a heating fluid may flow. A plurality of reactors 32 may be employed in parallel, to increase the total capacity of the reaction system.

Stream 34 of fluid gasification product leaving reactor 32 may preferably be treated to remove entrained solids, mainly comprising solid salts. In this preferred embodiment, the reaction apparatus comprises additionally a separation unit, in particular a cyclone, a gravity separator, or a device comprising impactor plates, positioned in the fluid connection connecting the reaction tube with the heater, which separation unit is configured to remove entrained solids from the fluid gasification product. Suitably, the removal may be achieved by using cyclone 37. Solids 36 may be discharged from cyclone 37, for example, via a lock chamber (not drawn). Removing solids at this point has an advantage that less heat is required when the fluid gasification product is further heated in a next heating step, as described hereinafter.

In accordance with the invention, fluid gasification product may be further heated in heat exchanger 35 using the heat of, for example, hot gas 38 produced in a hot-gas producing unit (not drawn), and to use the further heated fluid gasification product as first heating fluid 40 in reactor 32. For optimisation purposes, vessel 39, for example a tube or an arrangement of parallel tubes, may be incorporated receiving further heated fluid gasification product from heat exchanger 35. Vessel 39 provides that further heated fluid gasification product will have an increased residence time at the highest temperature prevailing in heating and reaction system 30, which will have the advantageous effect of increasing the methane content of the fluid gasification product. In this embodiment, the reaction apparatus comprises additionally a vessel fluidly connected to the heater to receive further heated fluid gasification product from the heater and fluidly connected to the heating device to feed the further heated fluid gasification product into the heating device for use as the first heating fluid, which vessel is configured to hold the further heated fluid gasification product for a period of time.

With or without vessel 39 installed, additional heat exchanger 42 may be incorporated, transferring heat from further heated fluid gasification product to fluid gasification product before the latter enters heat exchanger 35. Alternatively, vessel 39 may be incorporated in the fluid connection between heat exchanger 42 and heat exchanger 35. In these embodiments, the reaction apparatus comprises additionally a heat exchanger positioned in the fluid connection connecting the heater with the heating device, and in the fluid connection connecting the reaction tube and with the heater, which heat exchanger is configured to exchange heat between the further heated fluid gasification product and the fluid gasification product.

It has been found particularly advantageous to employ as reactor 32 a reactor as shown in FIG. 3. Reactor 32 shown in FIG. 3 may comprise reaction tube 46, distribution plate 47, and the heating device, for example heating jacket 48 and/or in internal heating pipes (not drawn). Inlet pipe 50 for wet biomass may be fluidly connected with heat exchanger 29 (FIG. 1). Outlet pipe 52 for fluid gasification product may be fluidly connected to heat exchanger 35, optionally via heat exchanger 42 and/or cyclone 37 and/or vessel 39. When wet biomass enters through inlet pipe 50, it may have a temperature of at most $T_1$, as defined hereinbefore. When the fluid gasification product leaves reactor 32 through outlet pipe 52, it will have been heated to a temperature of at least $T_2$, as specified hereinbefore. Inlet pipe 54 for heating fluid may be fluidly connected with heat exchanger 35, optionally via heat exchanger 42 and/or vessel 39. Outlet pipe 56 for heating fluid may be fluidly connected with heat exchanger 29. The bed of suspended solid particles in the form of a fluidised bed 44 may be contained in reaction tube 46, downstream of distribution plate 47. An excess of solid particles may be withdrawn from reactor 32 via overflow pipe 58. Reaction tube 46 is adapted to allow wet biomass to pass in the longitudinal direction of the reaction tube, and counter-currently with the heating fluid flowing in heating jacket 48 and/or in internal heating pipes. Reactor 32 may be fluidly connected with lock chamber 59 for the purpose of introducing solid particles into the reactor.

Fluidised bed 44 has typically a length of at least 0.5 m, more typically at least 1 m. Fluidised bed 44 has typically a length of at most 10 m, more typically at most 5 m. For example, the length of fluidised bed 44 may suitably be 3 m. The cross sectional area of fluidised bed 44 is typically at most 1.8 m$^2$, more typically at most 20 dm$^2$. The cross sectional area of fluidised bed 44 is typically at least 1 cm$^2$, more typically at least 2 cm$^2$. For example, the cross sectional area of fluidised bed 44 may suitably be 4.5 cm$^2$. Preferably, fluidised bed 44 has the shape of a circular cylinder, typically having a length to diameter ratio in the range of from 5 to 50, more typically in the range of from 8 to 30. For example, the length to diameter ratio of fluidised bed 44 may suitably be 20. In fluidised bed 44, when having dimensions as specified in this paragraph, there is relatively little back-mixing, so that there is a temperature gradient over the length of the bed. A single reactor tube comprising a fluidised bed having dimensions as specified may be installed. Alternatively, a plurality of reaction tubes comprising a fluidised bed having dimensions as specified may be installed in parallel. The number of reaction tubes and fluidised beds may be in the range of from 2 to 20 (inclusive), in particular in the range of from 3 to 10 (inclusive).

An advantage of having fluidised bed 44 in which there is relatively little back-mixing is shown in FIG. 4. FIG. 4 shows the profiles of temperature t over length L of the bed and the heating fluid, substantially without back-mixing in the bed (situation A) and, for comparison, with substantial back-mixing in the bed (situation B). In situation A, there is a temperature gradient C in the bed, which extends from an inlet temperature $t_i$ to an outlet temperature $t_o$. In situation B, there is, as a consequence of back-mixing, virtually the same temperature over the length of the bed (D), except for a steep temperature gradient E near the inlet. F and G depict the temperature profiles of the heating fluids which can accommodate the heating profiles of the reaction tubes in situations A and B, respectively. In both cases Δt depicts the minimum temperature difference between the reaction tube and the heating fluid. With Δt being equal in situations A and B, temperature difference $\Delta t_A$ at the inlet of the heating fluid in situation A is substantially less than temperature difference $\Delta t_B$ at the inlet of the heating fluid inlet in situation B. This implies for the process depicted in FIG. 1 that in heat exchanger 35 fluid gasification product needs heating to achieve a smaller temperature increase in situation A than in situation B, which means that in situation A less heat is supplied from the hot-gas producing unit than in situation B.

Returning again to FIG. 1, and also with reference to FIG. 3, further heated fluid gasification product may be used as first heating fluid 40 in the heating device of reactor 32, for example heating jacket 48 and/or in internal heating pipes (not drawn). When the further heated fluid gasification product enters through inlet pipe 54 for use as the first heating fluid, it may have a temperature of at least $T_3$, as defined hereinbefore. When the fluid gasification product leaves reactor 32 through outlet pipe 56, it will have cooled down to a temperature of at most $T_4$, as specified hereinbefore. The fluid gasification product may be cooled down further in heat exchanger 29 against wet biomass. The fluid gasification product leaving heat exchanger 29 may typically have a temperature in the range of from 20° C. to 150° C., more typically in the range of from 40° C. to 120° C., for example 90° C.

The extensive recovery of heat as it may take place in any of heat exchangers 42 and 29 and in reactor 32 renders the process depicted in FIG. 1 a very energy efficient process in that the recovery of heat reduces the net energy supply to the process, in particular the energy supply in heat exchanger 35 by means of the hot gas 38.

When entering recovery system 60, the fluid gasification product may be depressurized over valve 61 to a pressure typically in the range of from 0.1 MPa to 20 MPa, more typically in the range of from 0.2 MPa to 15 MPa.

Depressurised fluid gasification product may be degassed in degasser 62, yielding a gas fraction and a liquid fraction. The gas fraction comprising high value gases, such as hydrogen and methane may be split into a methane-stream and a hydrogen-rich stream in, for example, membrane separator 64. The liquid fraction from degasser 62 may be depressurized further over valve 66, and further degassed in degasser 68, producing a gaseous fraction which may comprise carbon dioxide, methane, hydrogen, and hydrocarbons other than methane. The pressure downstream of valve 66 may typically be in the range of from 0.1 MPa to 5 MPa, more typically in the range of from 0.2 MPa to 3 MPa. The liquid product obtained in degasser 68 is an aqueous residue comprising salts. The aqueous residue may be treated in membrane separator 70 yielding water and an aqueous residue being enriched in salts.

The invention claimed is:

1. A process for the gasification of wet biomass, which process comprises
heating wet biomass at a pressure $P_p$ in the range of from 22.1 MPa to 35 MPa (absolute) from a temperature of at most $T_1$ to a temperature of at least $T_2$ by heat exchange with a first heating fluid, upon which heating a fluid gasification product is obtained,
further heating the fluid gasification product, and
using the further heated fluid gasification product as the first heating fluid, upon which use the further heated fluid gasification product is cooled down at a pressure $P_s$ in the range of from 22.1 MPa to 35 MPa (absolute) from a temperature of at least $T_3$ to a temperature of at most $T_4$,
wherein $T_1$, $T_2$, $T_3$ and $T_4$ are temperatures in ° C. in accordance with the mathematical formulae $$T_1=3.2\times P_p+301.6,$$

$$T_2=3.8\times P_p+292.4,$$

$$T_3=3.8\times P_s+292.4, \text{ and}$$

$$T_4=3.2\times P_s+301.6,$$

wherein $P_p$ and $P_s$ denote the pressures $P_p$ and $P_s$, respectively, in MPa.

2. A process as claimed in claim 1, wherein the wet biomass is selected from fermentation residues, sewage sludge, dredging sludge, algae, animal manures, and mixtures thereof, and comprises at least 40% w of water, relative to the total weight of the wet biomass.

3. A process as claimed in claim 1, wherein $T_1$, $T_2$, $T_3$ and $T_4$ are temperatures in ° C. in accordance with the mathematical formulae $$T_1=2.9\times P_p+306.2,$$

$$T_2=4.1\times P_p+287.8,$$

$$T_3=4.1\times P_s+287.8, \text{ and}$$

$$T_4=2.9\times P_s+306.2,$$

wherein $P_p$ and $P_s$ denote the pressures $P_p$ and $P_s$, respectively, in MPa having values in the range of from 22.1 MPa to 33 MPa.

4. A process as claimed in claim 3, wherein $T_1$, $T_2$, $T_3$ and $T_4$ are temperatures in ° C. in accordance with the mathematical formulae $$T_1=2.6\times P_p+310.8,$$

$$T_2=4.4\times P_p+283.2,$$

$$T_3=4.4\times P_s+283.2, \text{ and}$$

$$T_4=2.6\times P_s+310.8,$$

wherein $P_p$ and $P_s$ denote the pressures $P_p$ and $P_s$, respectively, in MPa having values in the range of from 22.1 MPa to 32 MPa.

5. A process as claimed in claim 1 the process comprises heating the wet biomass effecting an increase in temperature of at least 10° C.

6. A process as claimed in claim 5, wherein the process comprises heating the wet biomass effecting an increase in temperature in the range of from 20° C. to 450° C.

7. A process as claimed in claim 1, wherein the process comprises cooling down the further heated gasification product effecting a decrease in temperature of at least 10° C.

8. A process as claimed in claim 7, wherein the process comprises cooling down the further heated gasification product effecting a decrease in temperature in the range of from 20° C. to 450° C.

9. A process as claimed in claim 1, wherein the heat exchange comprises heat exchange between a flow of the wet biomass and a flow of the further heated fluid gasification product which is counter-current with the flow of the wet biomass.

10. A process as claimed in claim 1, wherein heating the fluid gasification product obtained comprises heat exchange with a second heating fluid.

11. A process as claimed in claim 10, wherein the second heating fluid is a hot gas.

12. A process as claimed in claim 1, wherein further heating the fluid gasification product comprises heating to effect a temperature increase in the range of from 10° C. to 200° C.

13. A process as claimed in claim 12, wherein further heating the fluid gasification product comprises heating to effect a temperature increase of the fluid gasification product in the range of from 20° C. to 150° C.

14. A process as claimed in claim 1, wherein the process comprises as an additional step maintaining the temperature of the further heated fluid gasification product for a period of at least 5 minutes.

15. A process as claimed in claim 14, wherein maintaining the temperature comprises maintaining the temperature within a margin of plus or minus 50° C.

16. A process as claimed in claim 14, wherein maintaining the temperature comprises maintaining the temperature for a period in the range of from 5 minutes to 1 hour.

17. A process as claimed in claim 5, wherein the process comprises heating the wet biomass effecting an increase in temperature in the range of from 30° C. to 400° C.

18. A process as claimed in claim 7, wherein the process comprises cooling down the further heated gasification product effecting a decrease in temperature in the range of from 30° C. to 400° C.

19. A process as claimed in claim 14, wherein maintaining the temperature comprises maintaining the temperature within a margin of plus or minus 40° C.

20. A process as claimed in claim 14, wherein maintaining the temperature comprises maintaining the temperature within a margin of plus or minus 30° C.

21. A process as claimed in claim 14, wherein maintaining the temperature comprises maintaining the temperature for a period in the range of from 10 minutes to 40 minutes.

\* \* \* \* \*